Feb. 3, 1942. W. F. HALL 2,271,736
STRIP TREATING APPARATUS
Filed June 28, 1939 9 Sheets-Sheet 2
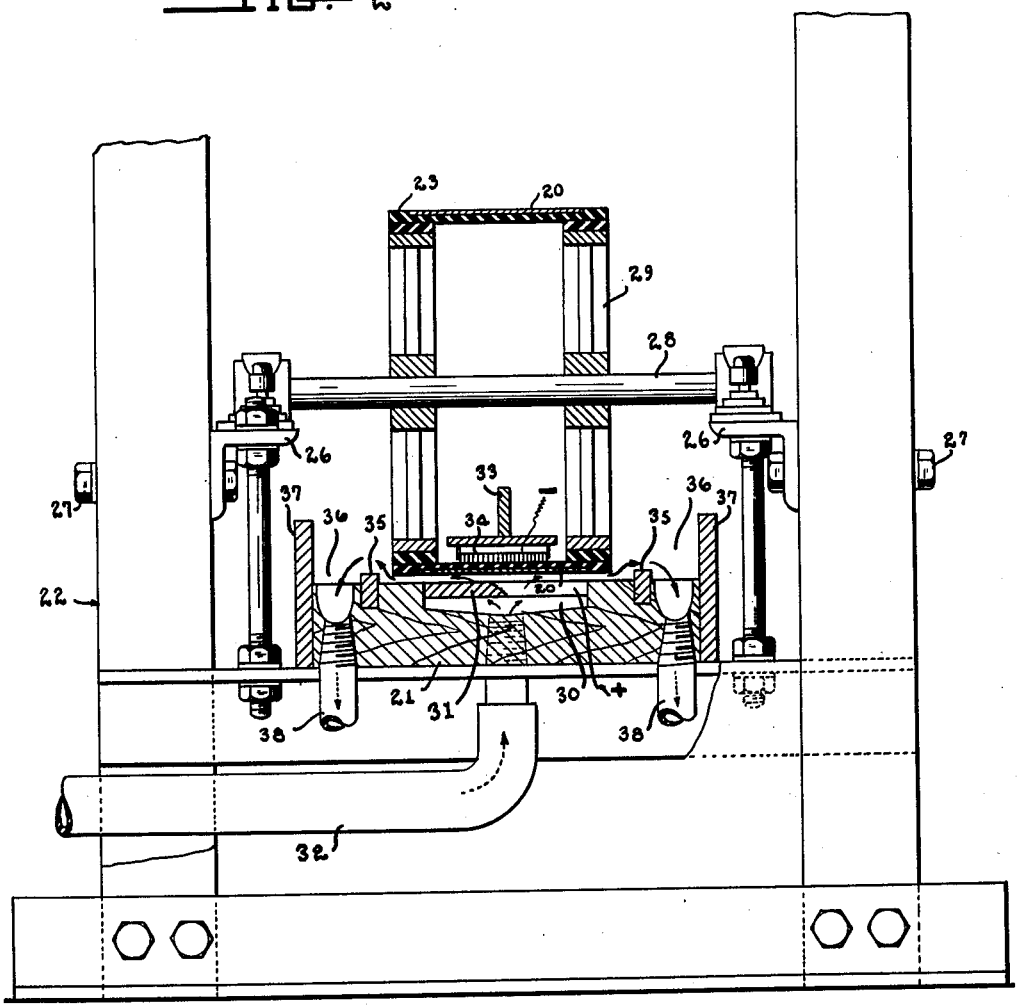
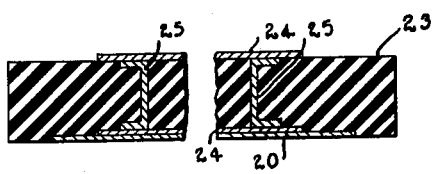
Inventor
WESLEY F. HALL
by *Toulmin & Toulmin*
Attorneys

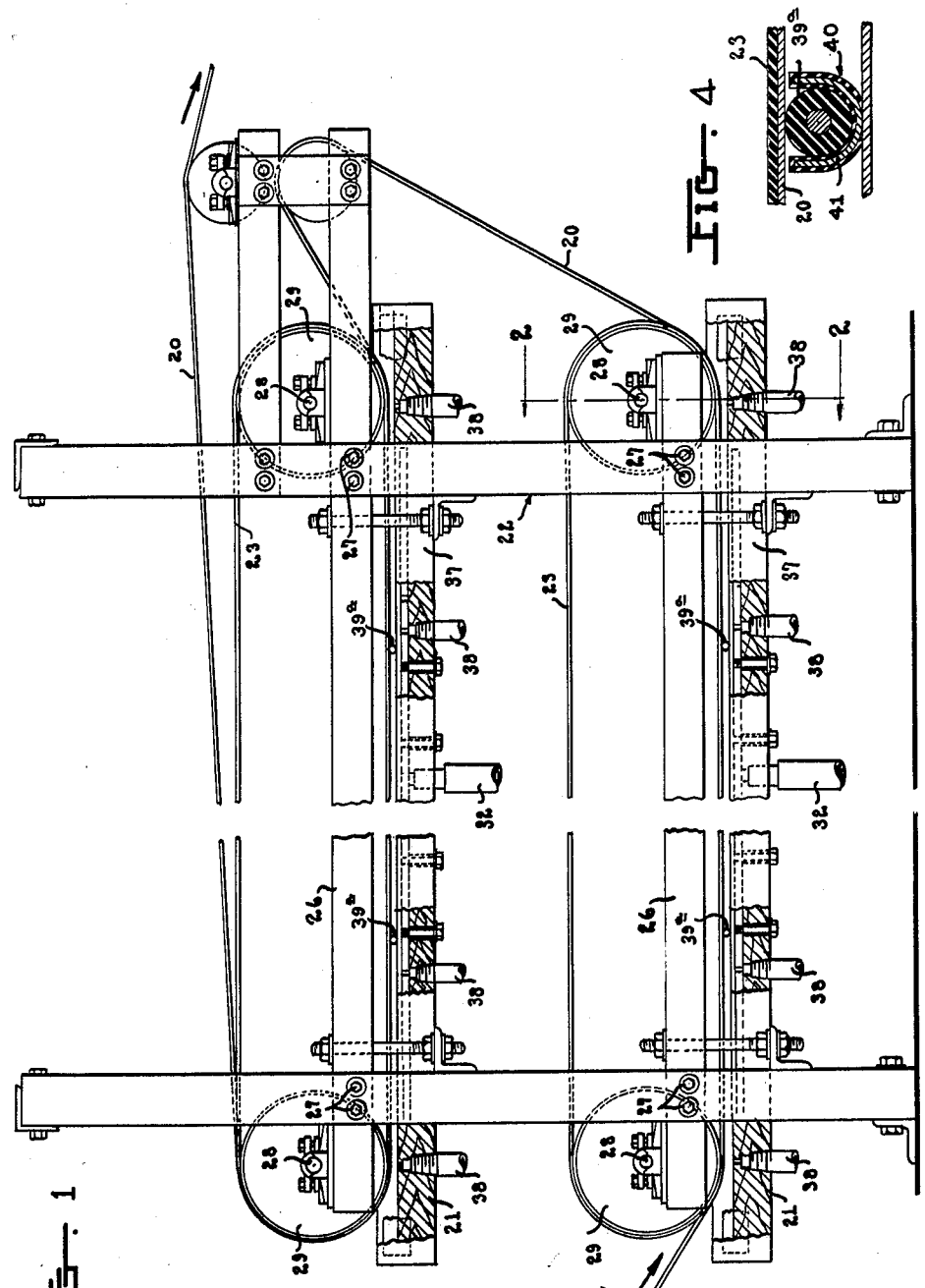

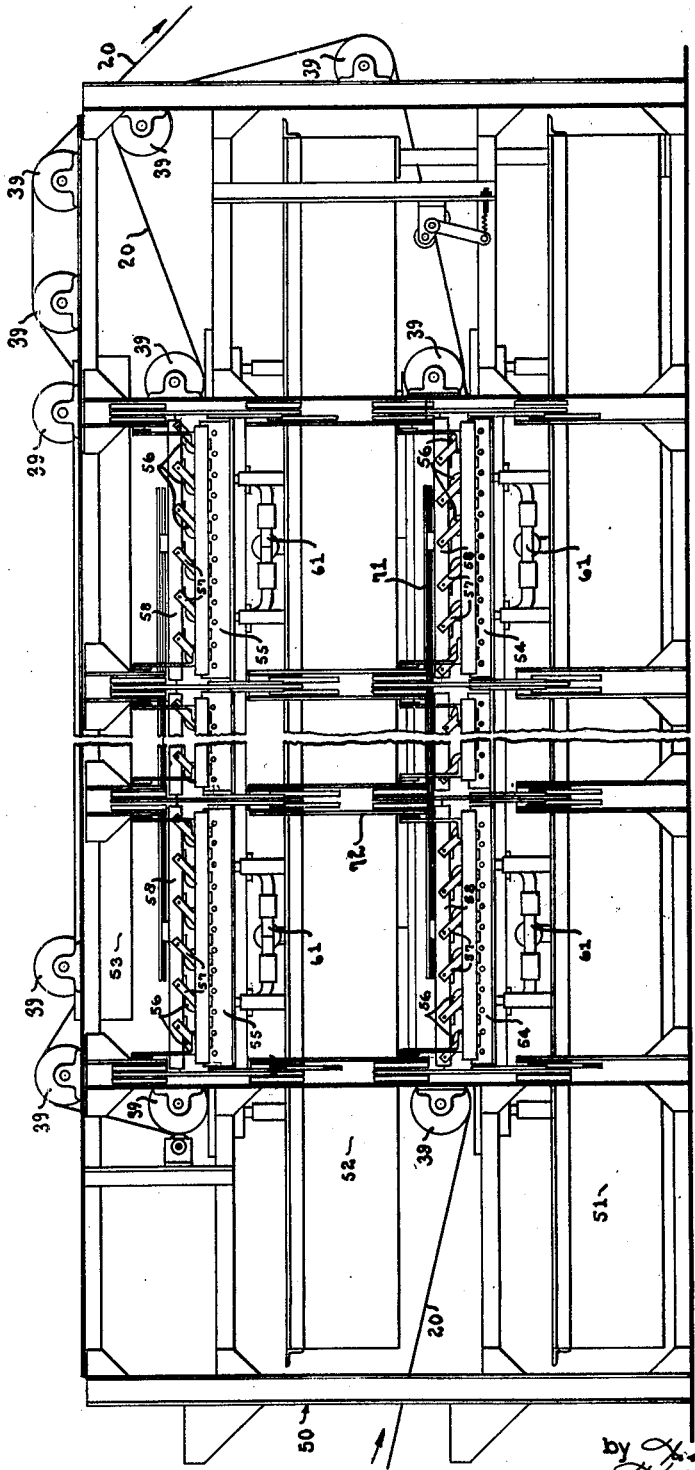

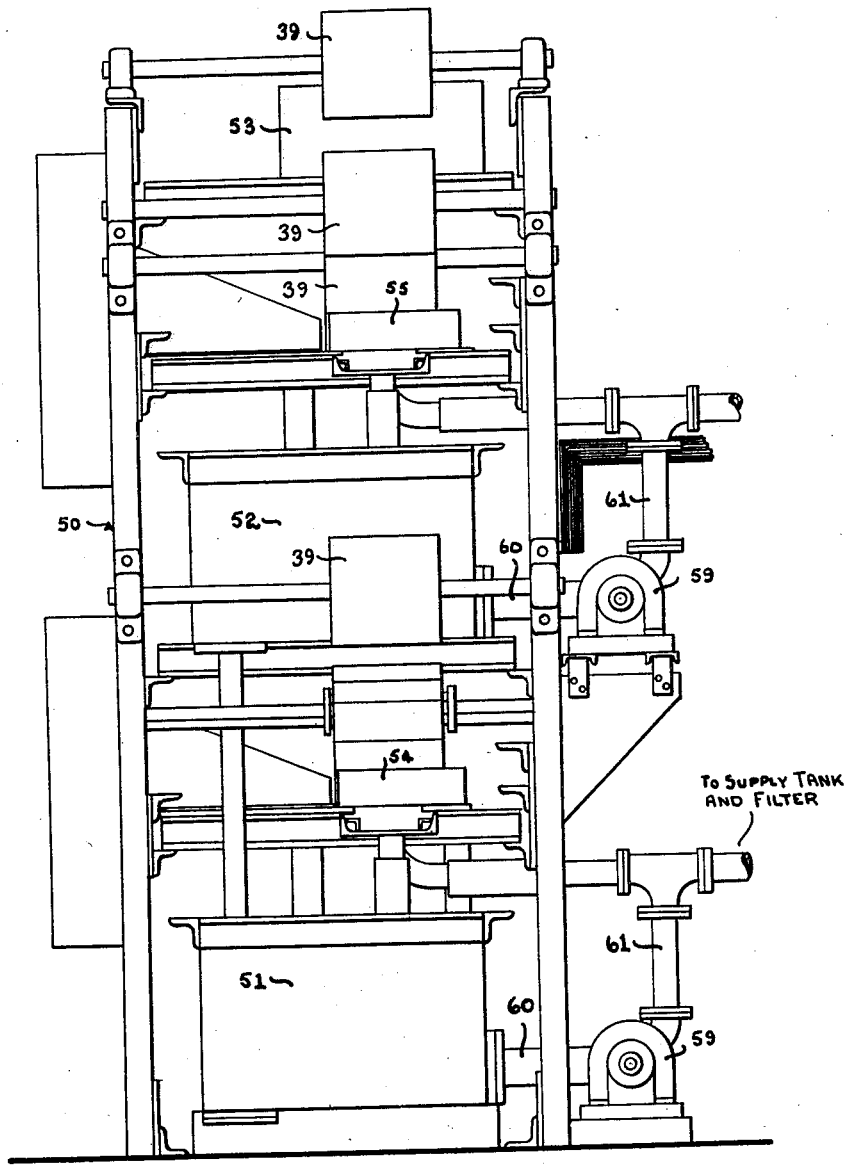

Feb. 3, 1942. W. F. HALL 2,271,736
STRIP TREATING APPARATUS
Filed June 28, 1939 9 Sheets-Sheet 5
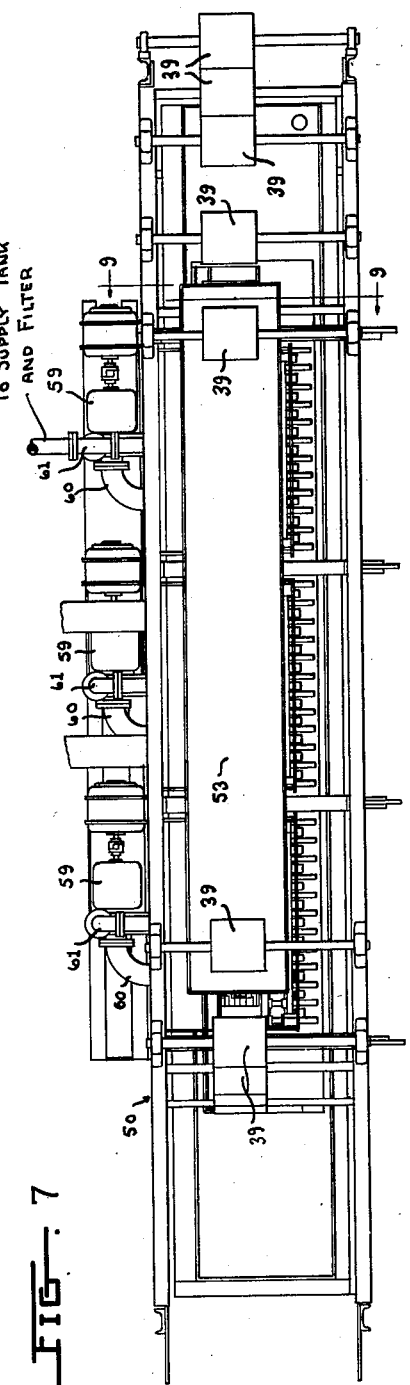
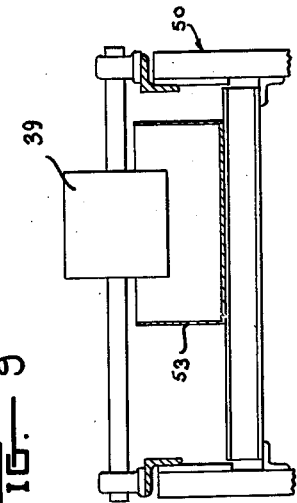
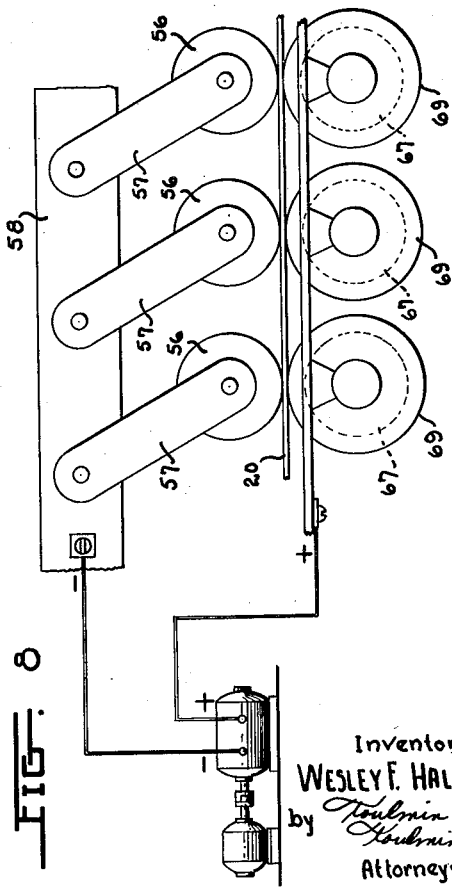
Inventor
WESLEY F. HALL
by Toulmin &
Toulmin
Attorneys

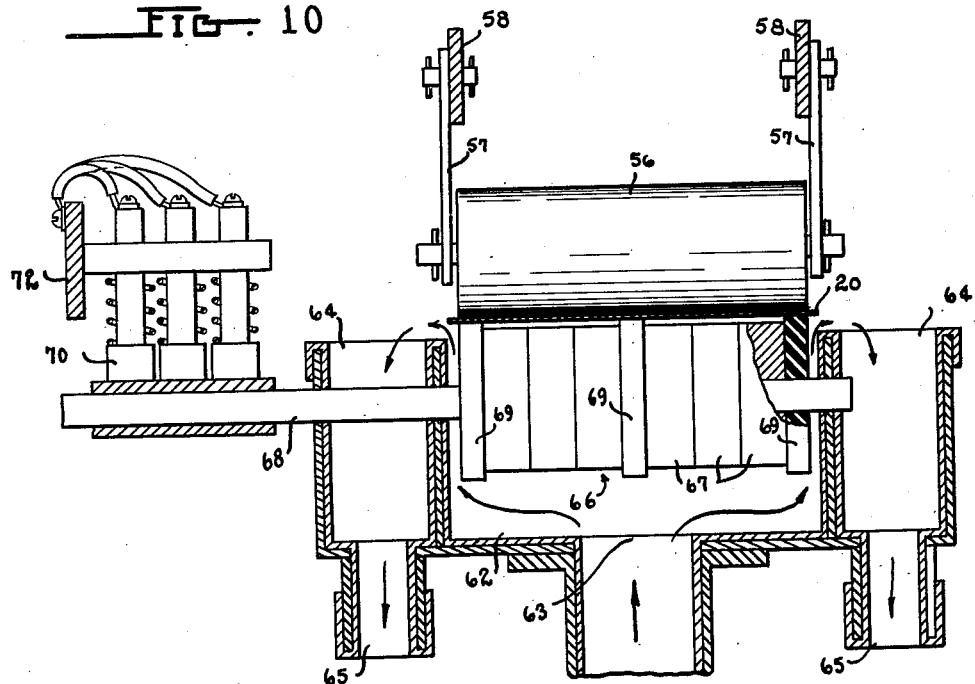
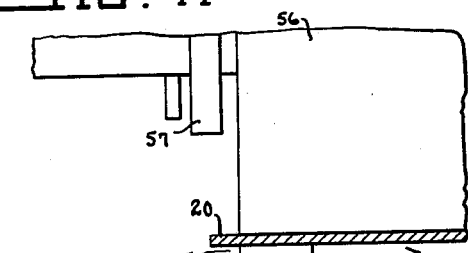
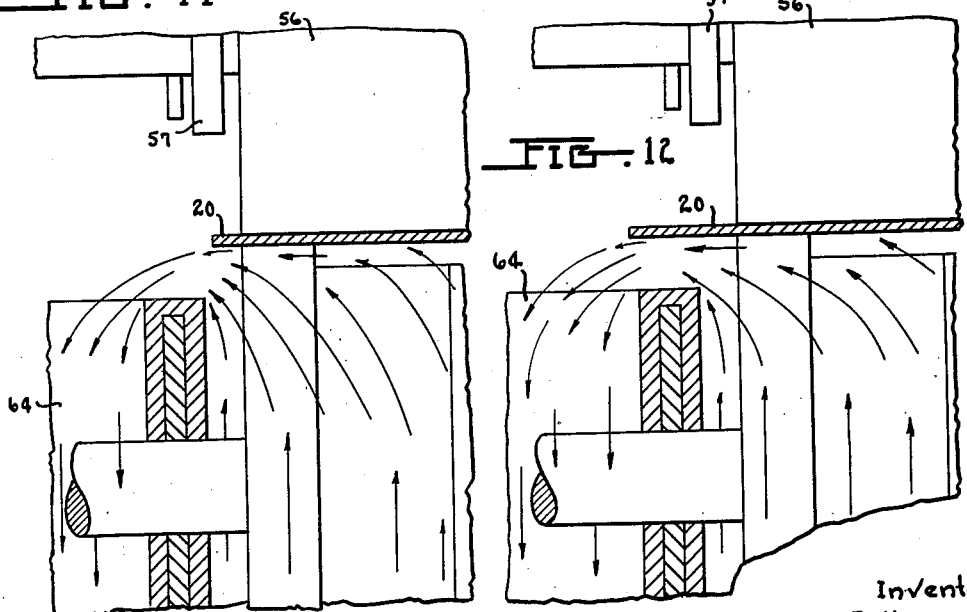

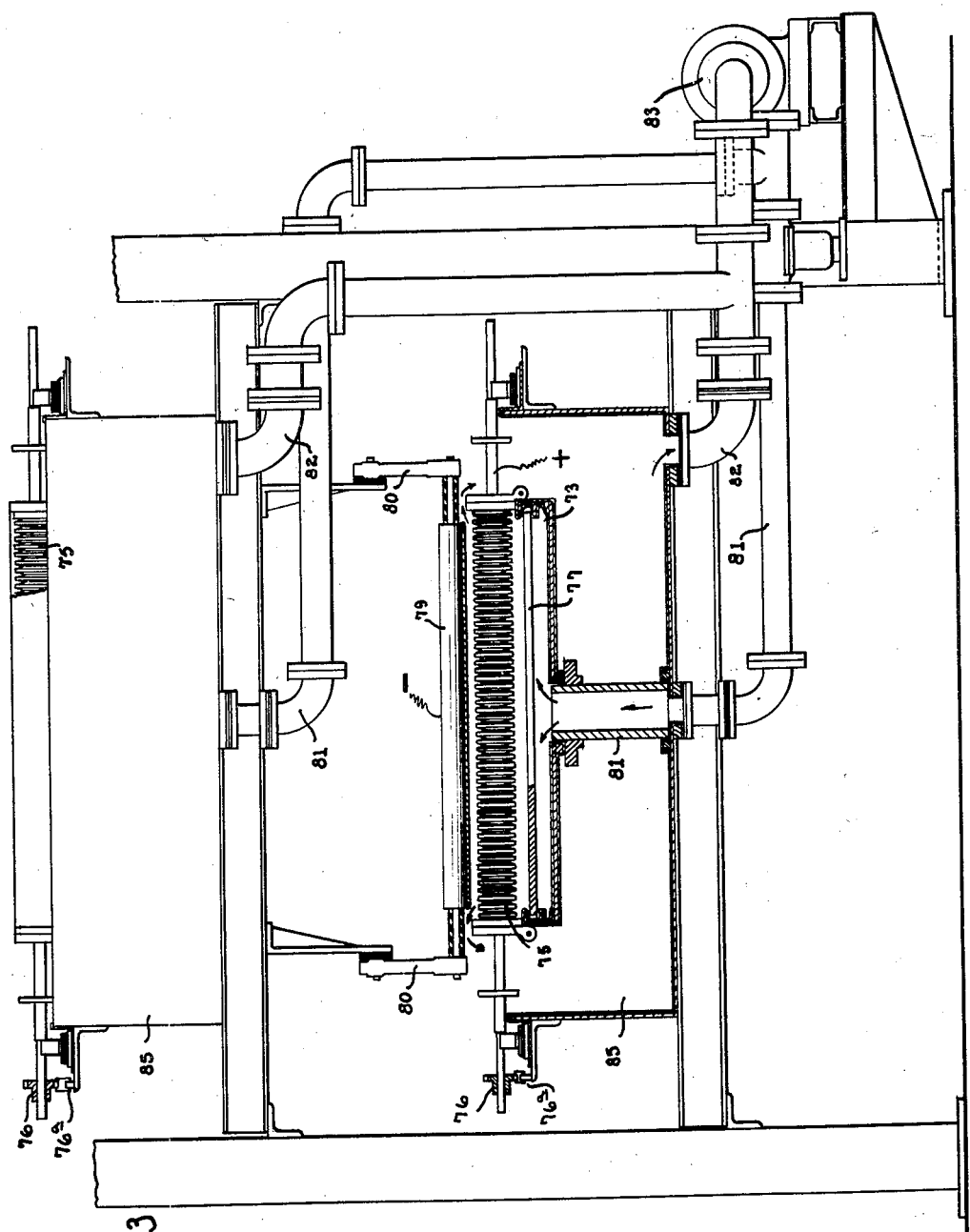

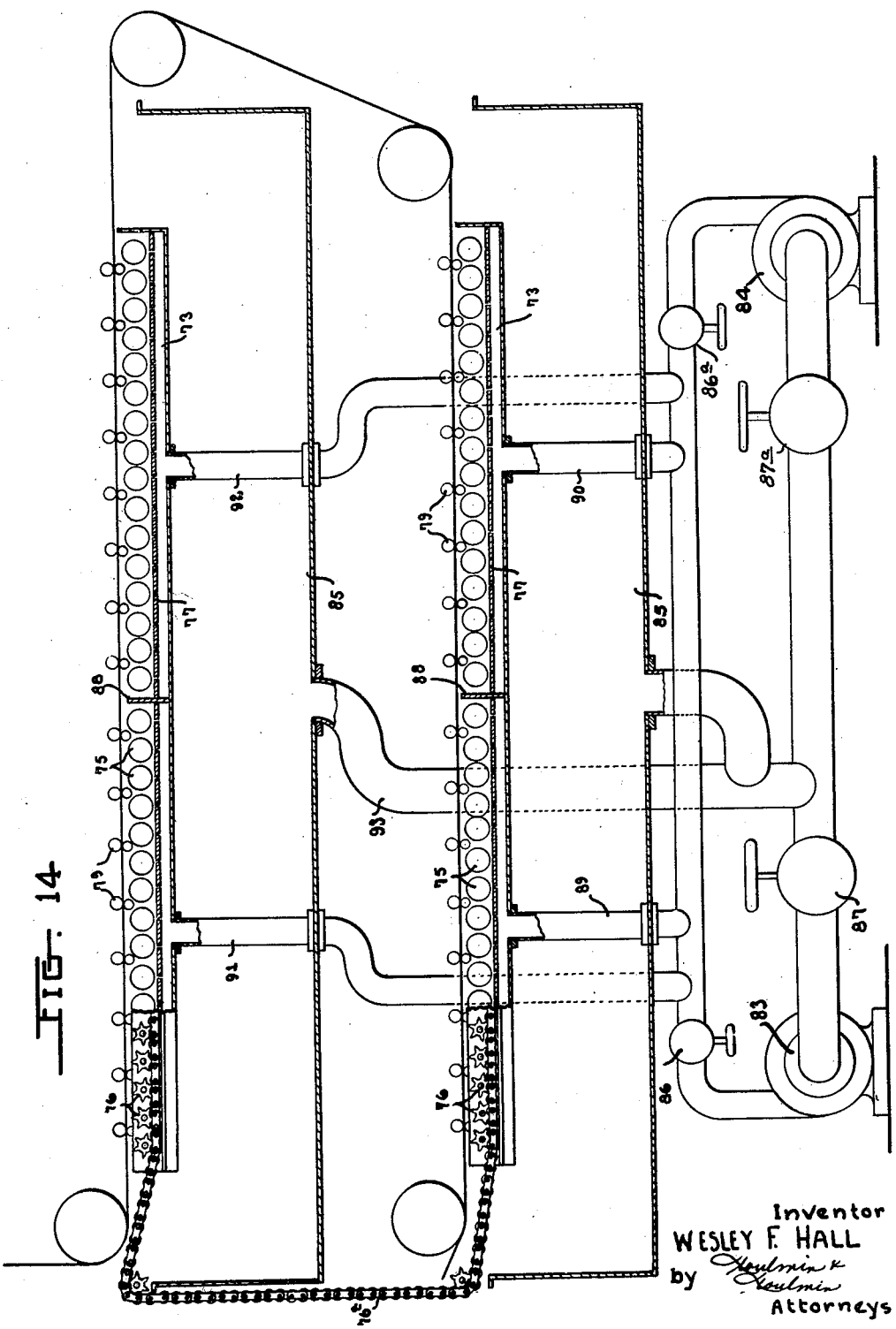

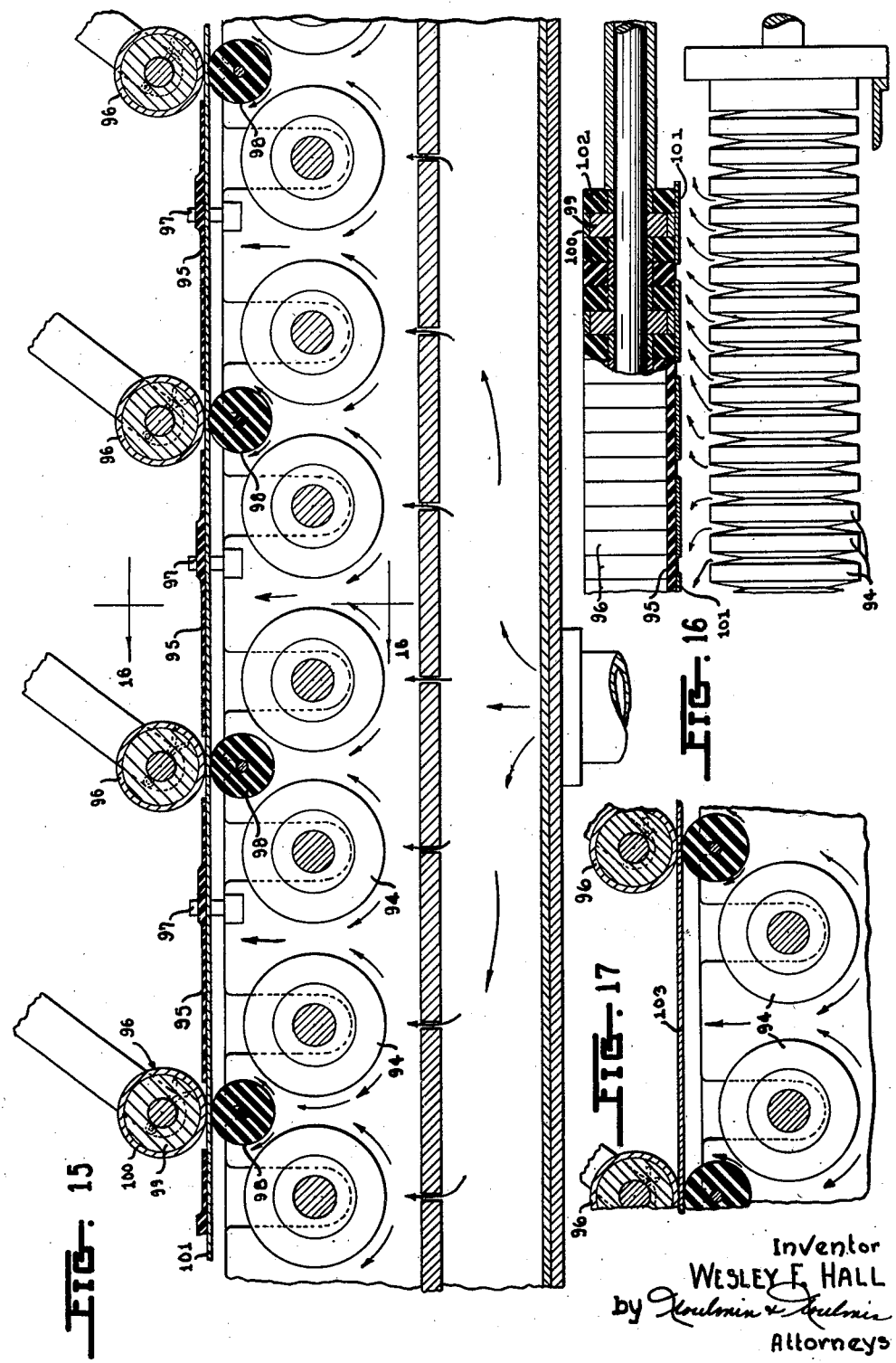

Patented Feb. 3, 1942

2,271,736

UNITED STATES PATENT OFFICE 2,271,736

STRIP TREATING APPARATUS

Wesley F. Hall, Matawan, N. J., assignor to Hanson-Van Winkle-Munning Company, Matawan, N. J., a corporation of New Jersey Application June 28, 1939, Serial No. 281,681

14 Claims. (Cl. 204—206)

This invention, in general, relates to an apparatus adapted for electrolytically treating continuous strips or ribbon of material, and is a continuation in part of my application Serial No. 219,619, filed July 16, 1938. Modifications of this invention are disclosed and claimed in my co-pending applications Serial 216,322, filed June 28, 1938, and Serial 281,682, filed June 28, 1939.

The invention more particularly is concerned with the provision of an improved mechanism for continuous electrocleaning and electroplating metal strip. The apparatus is especially adapted for electrolytic plating of thin ribbons of steel of conventional width used in the manufacture of tin cans. Utilization of this invention, however, can be made for electrolytically treating various materials both metallic and nonmetallic and of continuous or discontinuous lengths. Various electrolytes may also be employed, depending upon the material being processed and the kind of treatment desired.

An important object of this invention is to provide an apparatus for electrocleaning, pickling or plating continuous strips of material at high current densities, for instance using 200 to 1000 amperes per square foot or more, without the necessity of carrying the current through the strip for a long distance.

Another object is to provide an improved electrocleaning apparatus for treating strip material on one side at a time while maintaining the opposite side substantially free from contact with electrolyte and wherein the current flows transversely through the sheet or strip from the anodes on the wet side to the cathodes directly above the anodes and in contact with the dry side of the strip.

Another object of this invention is to provide an apparatus for treating strip material on one side at a time, the other side being held against electrical contacts spaced therealong and arranged so that they continuously remain in contact with the strip either rolling or traveling with the strip as it is moved along in contact with the electrolyte.

Another object of this invention is to provide an apparatus for electrocleaning and plating a plurality of continuous strips at high current densities while maintaining one side of the strips in contact with a rubber pad or backing.

Another object of this invention is to provide an apparatus for electroprocessing metal wherein the metal is electrochemically treated on one side with an electrolyte having submerged rotating electrode which supplies current to the strip through the electrolyte and is conducted away from the strip on the opposite side by spaced electrical contacts.

Another object is to provide an improved apparatus for electroplating continuous strip material wherein the movement of the strip is used to rotate the anode as the strip travels through the electrolyte.

Another object is to provide an apparatus for alternately electrochemically treating a moving metal strip or strips on one side and then on the other with the same or different electrolyte while continuously moving both the strip material and the electrolyte.

Another object is to provide an apparatus for electrocleaning or plating continuous strips which is arranged to economize space to the maximum without lowering the efficiency of the machine.

Another object is to provide a machine for electroplating strips or sheets of material wherein one side of the strip is treated with electrolyte under pressure so that the surface of the sheet being treated is kept completely covered with electrolyte. The pressure of the electrolyte supplied tends to float the strip or sheet of material being treated upwardly against electrodes which rest upon the opposite side of the sheet. To accomplish this the volume of electrolyte delivered against the sheet is great enough to create this lifting force. The electrolyte flows transversely of the strip and escapes between the edges of the strip being treated and the side walls of the compartment beneath the strip. This transverse movement of the electrolyte continually presents fresh electrolyte against the surface of the sheet and further sweeps the sheet or strip free of hydrogen bubbles or other matter tending to obstruct contacting of the electrolyte with all surface portions of the sheet.

Another object of this invention is to provide an improved apparatus wherein the anodes are located substantially directly beneath the cathodes between which the strip or sheet of metal being treated is moved and wherein electrolyte is forced upward against the under side of the sheet. This results in a direct current flow through the sheet instead of the old practice of having the current flow from the anodes into the sheet and then along the sheet to the cathode contacts. This arrangement enables the effective use of a very much higher amperage per square foot which permits an increase in speed of the movement of the strip through the machine.

Another object is to provide an improved machine of this type wherein the speed of the strip may be substantially increased while efficiently electroplating the strip on opposite sides with the same or different metals, and to apply a very much greater amount of material per square foot than has heretofore been possible with this speed of the strip.

Another object is to provide a continuous strip plating apparatus wherein the barriers between the sections of the strip act as supports and guides for the strip material.

Another object is to provide an improved apparatus of this nature wherein the electrolyte is ejected in the form of jets against the bottom of rotating anodes so as to continuously clean the anodes of oxides before further oxidation takes place producing higher oxides which result in the formation of a black film that is insoluble on the surface of the anodes.

Another object of this invention is to provide a machine for electroplating moving strip material so that different thickness of plate can be applied to certain sections and the number of layers or coatings applied may be controlled.

Another object is to provide in a machine of this type means for discharging the electrolyte evenly beneath the sheet or strip being treated and floating the strip by the pressure of the electrolyte against it so as to maintain a sparkless contact between the strip and the opposite electrode in contact with the other side of the strip.

Still another object is to provide an improved electroplating machine for treating a moving strip whereby the electrolyte is forced against one side of the strip and across it transversely of the direction in which the strip is moving, the electrolyte being continuously circulated under sufficient pressure to float the strip upward against the electrodes adjacent the other side of the strip.

The construction and operation will be described particularly with reference to electroplating, but it will be appreciated that this invention is also adapted for use to subject moving strips or sheets of material to electrocleaning, pickling or similar chemical or electrochemical treatment. In each instance the appropriate electrolyte and electrical connections will be made to effect the desired process.

This invention offers many advantages over the apparatus heretofore employed. In the use of the apparatus for electrocleaning and plating strip material of this invention a product is obtained having a more uniform and superior coating than has heretofore been obtained. Furthermore the plating coat is applied more rapidly which permits increasing the speed of the strip which results in a higher rate of production of finished strip at lower cost.

Aside from the above mentioned improvements attained by this invention, increased current densities may be satisfactorily employed with increased speed of movement of the strip due to the novel arrangement of the electrodes. This is true whether the traveling belt electrical contact or spaced roller contacts are employed. It will be understood, of course, that the particular arrangement of the electrolyte tanks is merely illustrative of one aspect of my invention and that other equivalent arrangements may be used without departing from this invention.

Referring to the drawings:

Figure 1 is a vertical longitudinal section of one form of the continuous strip electroplating machine of this invention illustrating the double deck traveling belt arrangement for providing electrical contact to the strip;

Figure 2 is a vertical section through a part of the machine taken on the line 2—2 of Figure 1;

Figure 3 is a detail sectional view of the endless belt for providing electrical connection to the strip material;

Figure 4 is a detail sectional view of the roller for supporting and guiding the strip in the arrangement illustrated in Figure 1;

Figure 5 is an elevation view of a modification wherein the cathode electrical contact is made to the strip being processed by means of spaced rollers;

Figure 6 is an end elevation view of the modification illustrated in Figure 5;

Figure 7 is a plan view of the same mechanism;

Figure 8 is a fragmentary elevation detail view showing the arrangement of the cathode and anode electrical connections to a generator, which is shown in elevation, and the strip material; the movement of the strip material as shown in this view being arranged to rotate the spaced anodes;

Figure 9 is a fragmentary elevation sectional view of the machine shown in Figure 7 taken on the line 9—9;

Figure 10 is an elevation detail view illustrating the arrangement of the anode and cathode whereby the movement of the strip or sheet is adapted to rotate the anode;

Figures 11 and 12 are detail views showing the flow of electrolyte, illustrated by arrows, over the edges of the strip into the return drain, when treating relatively narrow and wide sheets respectively;

Figure 13 is an elevation view of a modification of the apparatus shown in Figure 5 wherein the anodes are separately rotated. Certain of the parts are in section and broken away to show the construction more clearly.

Figure 14 is a diagrammatic representational view of the apparatus shown in Figure 13, illustrating the pipe system for distributing and circulating the electrolyte to and from the tanks;

Figure 15 is a detail sectional view of the machine illustrated in Figure 13 arranged to treat multiple narrow strips or ribbons of material and wherein rubber or equivalent flexible backing material is disposed against the upper side of the strips and the openings therebetween;

Figure 16 is a fragmentary detail view showing the construction and arrangement of the electrodes and rubber backing when treating multiple ribbons or strips;

Figure 17 is a fragmentary detail view similar to Figure 15 wherein a relatively wide strip or sheet of material is treated. In this instance the use of rubber backing material is not necessary.

Referring to the drawings in detail, wherein like references indicate similar parts throughout the drawings, Figure 1 illustrates an apparatus for electroplating continuous strips or ribbons by this invention wherein the strip 20 is passed through the double deck electrolyte containing troughs 21 which are supported one above the other by means of the frame 22. The troughs may be made of wood or rubber covered steel. Cathode contacts to the strip are made by means of the endless belt 23 which travels around the rollers at the end of the tanks, as shown. The belt may be formed of current conducting material or preferably is made of rubber or equivalent composition and provided with metal or electrical current conducting bands 24 disposed on the outer surfaces of the belt, as shown in Figure 3. The bands are electrically connected by means of the metal member 25 which extends through the belt at spaced intervals along the same.

It will be understood that the strip material to be plated has been previously thoroughly cleaned by passing it through electrocleaning and pickling baths and rinsed prior to advancing it through the electroplating troughs. Further it will be appreciated that either alkaline or acid electrolyte cleaners may be employed and any one or more of the preliminary cleaning steps may be omitted prior to electroplating when such steps are deemed unnecessary.

In some cases where the metal strips to be cleaned and plated are coated with oil, grease or the like fatty substance, they may be first subjected to a solvent degreasing treatment prior to being electrolytically cleaned and subsequently electroplated. Various solvents may be used in this treatment for dissolving and removing the oil and grease. Non-inflammable chlorinated hydrocarbons are preferably used for this purpose; as an example trichlorethylene or the like may be utilized.

The strip material to be treated is drawn through the apparatus from conventional uncoilers, not shown, and after being thoroughly cleaned and plated on one side and then the other, it is wound up on similar coilers at the delivery end.

Referring to Figure 2, the trough 21 may be suspended from the angle irons 26 which are secured to the adjacent supporting frame 22 by means of the bolts 27. The angle irons 26 also afford a base for the shaft 28 and wheel or drum 29 around which the endless belt 23 travels. The central part of the trough is provided with a shallow chamber 30 extending lengthwise of the trough. In this chamber there are disposed anode members 31 which are maintained covered by electrolyte introduced adjacent the central bottom of the trough 21 through the rubber lined pipe or equivalent electrolyte resisting conduit 32.

The cathode electrode 33 is suitably disposed between the belt guide wheels 29 and is electrically connected to a roller 34 which provides a rolling contact against the electrical conducting member 24 on the inner side of the belt 23. In place of the roller 34 a sliding brush electrical contact member may be used for conducting the current from the strip through the belt and back to the source of supply.

Electrolyte is flowed into the troughs at suitably spaced intervals near the central bottom portion thereof and after contacting the strip flows over the side walls 35 of the trough into the gutters 36, as illustrated in Figure 2. The height of the wall 35 is such that electrolyte will be maintained up against the surface of the strip without flowing over the back of the belt upon contact roller 34. The outer walls 37 of the gutters are of sufficient height to prevent the splashing out or loss of the electrolyte. Waste electrolyte is drawn off through the return pipes 38 and filtered and, if necessary, treated to replenish the metal removed during plating and recirculated back to the troughs.

Supporting rolls 39a are used when necessary at intervals along the troughs to hold the strip substantially horizontal while it is plated on the underside. The pressure of the electrolyte flowing into the troughs tends to float the strip and thus aids in maintaining it in a horizontal position while passing through the electrolyte. The supporting rolls 39a are provided with graphite, rubber or other oilless bearings 40. The bearings are disposed in rubber covered U-shaped sockets 41, as illustrated in Figure 4, and are designed to provide smooth rotation of the guide and supporting rolls while submerged in water or electrolyte.

In Figures 5 to 12 there is illustrated an arrangement for electroplating a continuous metal strip, first on one side, then on the other, while moving it along and finally rinsing the plated sheet. When electroplating the strip it will be understood that either the same or different metal may be plated on the surfaces of the strip.

Referring to Figures 5 to 12, the frame, generally designated 50, supports the tanks 51 and 52, which will contain the electrolyte, and the rinse trough 53. Above the tanks 51 and 52 are positioned the troughs 54 and 55 respectively through which the strip 20 is moved. Rolls 39, of suitable size, are positioned above the tanks and arranged to guide the strip through the electroplating compartments. It will be observed by moving the strip in one direction through a plating trough, then around guide rolls at the end and back in the reverse direction through the next plating trough, as illustrated in Figure 5, that the opposite surfaces of the strip are successively treated.

A plurality of spaced cathode contact roll members 56 is provided for conducting electric current from the upper side of the strip. Preferably these members are rotatably mounted at their axle ends in the links 57 which in turn are pivotally fastened to the cathode rail or bar 58, as shown in Figure 10. These rolls rest by gravity upon the upper surface of the strip as it moves along and are adapted to move vertically in accordance with the variations of the surface of the strip. If desired spring pressed rolls may be used.

Electrolyte is supplied to the troughs 54 and 55 by means of the pumps 59 and connecting conduits 60 and 61. Where the plating troughs are divided into several compartments additional pumps and conduit means are provided for supplying electrolyte to the several compartments as indicated in Figure 5.

The plating troughs 54 and 55 are preferably constructed as shown in Figure 10, and comprise a basin 62 having a central inlet opening 63 through which electrolyte is supplied to the trough. Adjacent the sides of the central basin 62 of the trough are overflow drain compartments 64 into which the electrolyte overflows from the central basin and is returned to the supply tanks through the conduits 65.

Arranged in the trough 62 are rotatable anode members, generally designated 66, which are disposed beneath and to each side of cathode rolls 56. The anode electrodes are made up of wheel-like sections 67 which are mounted on the axle 68 and are adapted to be rotated by the movement of the strip as shown in Figure 10. For this purpose there are disposed preferably at the ends and central portion of the rotatable anodes 66 electrically insulated roller members 69. These rolls are of slightly larger diameter than the anodes and contact the strip 20 and maintain it out of contact with the anodes. As the strip is moved along between the cathode roll 56 and anode 66, rotation of the anode is effected due to the contact of the strip with the spaced guide rolls 69 which are mounted on the axle 68 of the anode members 67. Electrical connection to the anode is provided for by the spring pressed brushes 70 which contact the extremities of the axle 68 of the anode, as shown in Figure 10. The bus bars 71 and 72 are suitably positioned so as to conduct the electricity to the cathode rollers 56 and anode axle extensions respectively.

As shown in Figures 11 and 12 the electrolyte is forced upward beneath the anode members 66 and in contact with the under surface of the strip, flowing out laterally along the strip and outward into the gutters at the side of the troughs. This spilling over of the electrolyte into the side gutters carries the electrolyte transversely of the strip and in contact with the edges so that even plating of the strip is effected. In this manner a relatively narrow or wide strip may be evenly plated without building up of the coating on the edges. The volume of electrolyte delivered to the plating compartment beneath the sheet or strip is sufficient to create a pressure tending to float the strip upward against the cathode roll contact members providing a sparkless connection thereto as the strip is moved therealong. Further the flow of electrolyte over the anodes and transversely of the under side of the sheet continually presents fresh electrolyte against the sheet and further sweeps off any hydrogen bubbles which tend to form on the strip.

In Figures 13, 14, 15, 16 and 17, modifications of the electroplating machine illustrated in Figure 5 are shown. As indicated in Figures 13 and 14 the anodes 75 may be adapted to be rotated by power driven means. Preferably for effecting this a suitably driven sprocket and chain arrangement 76 and 76a, respectively, is employed. The plating trough 73 is provided with a perforated partition 77 which extends transversely across the trough and distributes the electrolyte beneath the circular anodes 75, as shown in Figure 15. Cathode rolls 79 are pivotally supported at their axial ends by the members 80 and are arranged to rest against the sheet or strip as illustrated in Figure 13. Strip supporting rolls similar to those shown in Figure 4 are positioned beneath the strip at intervals to maintain the same out of contact with the anodes 75.

The electrolyte which is pumped into the trough through the central conduit 81 fills the trough covering the anodes and contacts the under side of the strip forcing it against the cathode rolls 79. In this instance the electrolyte entering the trough spills over the sides thereof after contacting the strip and falls back into the tank.

Suitable conduit means 82 are provided through which the electrolyte is circulated, by means of pumps 83 and 84, to the tanks 85 and electroplating compartments positioned therein. As shown in Figure 14, either one or both of the pumps 83 and 84 may be operated to circulate the electrolyte. When operating with only one pump, for example 83, to force the electrolyte to both plating troughs and tanks, the valves 86 and 87 will be opened and valves 86a and 87a closed. The electroplating troughs preferably are divided into compartments by means of the partitions 88 and electrolyte supplied to each compartment through separate conduits such as illustrated in Figure 14 by the pipes 89, 90, 91 and 92. A common electrolyte return pipe means 93 may be employed for withdrawing electrolyte from the tanks 85. Further, it will be understood that when desired the electroplating in various sections may be arranged to comprise different electrolyte so as to apply various types of coatings onto the strip material moved therethrough.

The anode electrode is preferably made up of a plurality of wheel or thick disc like members 94 and 75 which comprise narrow rim portions forming V-shaped openings between adjacent anode disc members, as shown in Figures 16 and 13, respectively. In this manner the total surface presented by the anodes is substantially increased. Further, when a plurality of narrow strips is to be electroplated, use is made of a rubber or resilient backing member 95 which is positioned between the cathode roll contact members 96, as shown in Figure 15, so as to overlap between the strips and provide a rubber sealed backing for the strips. Space is left between the ends of the rubber strips for permitting the cathode rolls 96 to contact the upper side of the strip as it is moved through the plating trough. The rubber backing is maintained in place by means of the members 97 which may be suitably anchored upon the ledge of the plating trough. The guide rolls 98 are positioned beneath the cathode rolls 96 to maintain the strips in horizontal position.

As shown in Figure 16 the cathode roller 96 preferably comprises a metal core 99 and outer rim 100 which is composed of copper or an alloy to provide an efficient electrical contact with the narrow strip 101. Adjacent the metal contact core sections 99 are rubber synthetic resin or equivalent electrical insulating portions 102. These insulating sections are inserted so that the edges of the strip 101 will not receive an excessive amount of current which would tend to build up the plate along the edges producing an uneven coating. The strips 101 are arranged to be moved in contact with the cathode rolls 96 so that the electrical contacting portion 100 will centrally contact the strip as it is moved along.

When wide strips or ribbons of metal are to be plated, as shown in Figures 13 and 17, the rubber backing filler strips 95 need not be used. This arrangement is shown in Figure 17 wherein the wide solid sheet 103 is illustrated as being moved through the plating trough.

During the plating operation the electrolyte fills the space between the anode and the strip at all times. Arrangements may be made for adjustably raising or lowering the anode members as they become smaller in diameter. In the application of the plating the strip in each instance is made the cathode by means of the direct contacts made along the back of the strip. The strip is subjected to high current densities which are on the order of 200 to 1000 amperes per square foot and the strip is rapidly and efficiently plated. After the plating operation the strip is rinsed and then conducted to the burnishing or polishing section, if it is desired to further treat the plate.

Instead of burnishing or polishing the plating, it may be fluxed or heated for improving the physical characteristics of the deposit in accordance with the particular metal or alloy forming the plating coating. By the particular location of the anode and cathode members with respect to the sheet or strip being plated and the constant circulation of the electrolyte under pressure against the underside of the strip, a very much higher amperage per square foot can be employed and a higher speed of movement of the strip can be maintained. This results in increasing the production of plated strip material with consequent lowering of electroprocessing costs.

It will be obvious that the details of this apparatus for electroprocessing strips may be widely varied while preserving the principles of this invention, and it will be understood that such modifications as come within the scope of the disclosure and claims are comprehended to be within this invention.

Having thus fully described my invention, what I claim as new and desire to secure by Letters Patent is:

1. In an electroprocessing machine, a continuously moving cathodic strip presenting a straight area, a cell opposite and beneath said area adjacent the straight portion of the strip, the strip being spaced from the bottom and side walls of the cell, the spacing between the side walls and strip providing a restricted passageway for the flow of the electrolyte over said side walls, an anode in each cell, means of supplying electrolyte under pressure positioned to direct the flow of electrolyte over said anode and engage the bottom of the strip while under pressure and overflow over the top of the cell beneath the bottom and edges of the strip, and a cathodic hold-down contact means contacting the upper dry side of the strip within the area under electrolytic fluid pressure and engaging the strip as it moves, and whereby the opposite side of the strip is continuously plated while in straight condition.

2. In an electroprocessing machine, a continuously moving cathodic strip looped to present successive straight areas with opposite sides alternating, a cell opposite and beneath each area adjacent the straight portion of the strip, the strip being spaced from the bottom and side walls of the cell, the spacing between the side walls and strip providing a restricted passageway for the flow of the electrolyte over said side walls, an anode in each cell, means to mechanically support the strip on its underside in spaced relationship from said anode, means of supplying electrolyte under pressure positioned to direct the flow of electrolyte over said anode and engage the bottom of the strip while under pressure and overflow over the top of the cell beneath the bottom and edges of the strip, and a cathodic hold-down contact means contacting the upper dry side of the strip within the area under electrolytic fluid pressure and engaging the strip as it moves, whereby opposite sides of the strip are successively plated while in straight condition.

3. In an electroprocessing machine, a continuously moving cathodic strip looped to present successive straight areas with opposite sides alternating, a cell opposite and beneath each area adjacent the straight portion of the strip, the strip being spaced from the bottom and side walls of the cell, the spacing between the side walls and strip providing a restricted passageway for the flow of the electrolyte over said side walls, an anode in each cell, means of supplying electrolyte under pressure positioned to direct the flow of electrolyte over said anode and engage the bottom of the strip while under pressure and overflow over the top of the cell beneath the bottom and edges of the strip, and a rolling cathodic hold-down contact means contacting the upper dry side of the strip within the area under electrolytic fluid pressure and continuously engaging the strip as it moves, whereby opposite sides of the strip are successively plated while in straight condition.

4. In an electroprocessing machine, a continuously moving cathodic strip looped to present successive straight areas with opposite-sides alternating, a cell opposite and beneath each area adjacent the straight portion of the strip, the strip being spaced from the bottom and side walls of the cell, the spacing between the side walls and strip providing a restricted passageway for the flow of the electrolyte over said side walls, an anode in each cell, means to mechanically support the strip on its underside in spaced relationship from said anode, means of supplying electrolyte under pressure positioned to direct the flow of electrolyte over said anode and engage the bottom of the strip while under pressure and overflow over the top of the cell beneath the bottom and edges of the strip, and a rolling cathodic hold-down contact means contacting the upper dry side of the strip within the area under electrolytic fluid pressure and engaging the strip as it moves, whereby opposite sides of the strip are successively plated while in straight condition.

5. In an electroprocessing machine, a continuously moving cathodic strip looped to present successive straight areas with opposite sides alternating, a cell opposite and beneath each area adjacent the straight portion of the strip, the strip being spaced from the bottom and side walls of the cell, the spacing between the side walls and strip providing a restricted passageway for the flow of the electrolyte over said side walls, an anode in each cell, means of supplying electroyte under pressure positioned to direct the flow of electrolyte over said anode and engage the bottom of the strip while under pressure and overflow over the top of the cell beneath the bottom and edges of the strip, and a cathodic hold-down contact means comprising an endless belt movable with said strip contacting the upper dry side of the strip within the area under electrolytic fluid pressure and engaging the strip as it moves, whereby opposite sides of the strip are successively plated while in straight condition.

6. In an electroprocessing machine, a continuously moving cathodic strip looped to present successive straight areas with opposite sides alternating, a cell opposite and beneath each area adjacent the straight portion of the strip, the strip being spaced from the bottom and side walls of the cell, the spacing between the side walls and strip providing a restricted passageway for the flow of the electrolyte over said side walls, an anode in each cell, means to mechanically support the strip on its underside in spaced relationship from said anode, means of supplying electrolyte under pressure positioned to direct the flow of electrolyte over said anode and engage the bottom of the strip while under pressure and overflow over the top of the cell beneath the bottom and edges of the strip, and a cathodic hold-down contact means comprising an endless belt movable with said strip within the area under electrolytic fluid pressure contacting the upper dry side of the strip and continuously engaging the strip as it moves, whereby opposite sides of the strip are successively plated while in straight position.

7. In an electroprocessing machine, a continuously moving cathodic strip looped to present successive straight areas with opposite sides alternating, a cell opposite and beneath each area adjacent the straight portion of the strip, the strip being spaced from the bottom and side walls of the cell, the spacing between the side walls and strip providing a restricted passageway for the flow of the electrolyte over said side walls, an anode in each cell, roller means to mechanically support the strip on its underside in spaced relationship from said anode, means of supplying electrolyte under pressure positioned to direct the flow of electrolyte over said anode and engage the bottom of the strip while under pressure and overflow over the top of the cell beneath the bottom and edges of the strip, and a cathodic hold-down contact means contacting the upper dry side of the strip within the area under electrolytic fluid pressure and continuously engaging the strip as it moves, whereby opposite sides of the strip are successively plated while in straight condition.

8. In an electroprocessing machine, a continuously moving cathodic strip looped to present successive straight areas with opposite sides alternating, a cell opposite and beneath each area adjacent the straight portion of the strip, the strip being spaced from the bottom and side walls of the cell, the spacing between the side walls and strip providing a restricted passageway for the flow of the electrolyte over said side walls, an anode having means for rotatively supporting said anode in contact with the strip and which are adapted to be rotated during movement of said strip in each cell, means for supplying electrolyte under pressure positioned to direct the flow of electrolyte over said anode and engage the bottom of the strip while under pressure and overflow over the top of the cell beneath the bottom and edges of the strip, and a cathodic hold-down contact means contacting the upper dry side of the strip within the area under electrolytic fluid pressure and continuously engaging the strip as it moves, whereby opposite sides of the strip are successively plated while in straight condition.

9. In an electroprocessing machine, a plurality of continuously moving cathodic strips looped to present successive straight areas with opposite sides alternating, a cell opposite and beneath each area adjacent the straight portion of the strips, the strips being spaced from the bottom and side walls of the cell, an anode in each cell, means of supplying electrolyte under pressure positioned to direct the flow of electrolyte over said anode and engage the bottom of the strips while under pressure and overflow over the top of the cell beneath the bottom and edges of the strips, the spacing between the side walls and strip providing a restricted passageway for the flow of the electrolyte over said side walls, and a cathodic hold-down contact means contacting the upper dry side of the strips within the area under electrolytic fluid pressure and continuously engaging the strips as they move, whereby opposite sides of the strips are successively plated while in straight condition, electrical insulating backing material, and means for maintaining the side of said strips opposite to that in contact with said electrolyte in engagement with said electrical insulating backing material.

10. In an electroprocessing machine, a plurality of continuously moving cathodic strips looped to present successive straight areas with opposite sides alternating, a cell opposite and beneath each area adjacent the straight portion of the strips, the strips being spaced from the bottom and side walls of the cell, an anode in each cell, means of supplying electrolyte under pressure positioned to direct the flow of electrolyte over said anode and engage the bottom of the strips while under pressure and overflow over the top of the cell beneath the bottom and edges of the strips, the spacing between the side walls and strip providing a restricted passageway for the flow of the electrolyte over said side walls, and a rolling cathodic hold-down contact means contacting the upper dry side of the strips within the area under electrolytic fluid pressure and engaging the strips as they move, whereby opposite sides of the strips are successively plated while in straight condition, electrical insulating backing material, and means for maintaining the side of said strips opposite to that in contact with said electrolyte in engagement with said electrical insulating backing material.

11. In an electroprocessing machine, a plurality of continuously moving cathodic strips looped to present successive straight areas with opposite sides alternating, a cell opposite and beneath each area adjacent the straight portion of the strips, the strips being spaced from the bottom and side walls of the cell, an anode in each cell, means of supplying electrolyte under pressure positioned to direct the flow of electrolyte over said anode and engage the bottom of the strips while under pressure and overflow over the top of the cell beneath the bottom and edges of the strips, the spacing between the side walls and strip providing a restricted passageway for the flow of the electrolyte over said side walls, and a rolling cathodic hold-down contact means contacting the upper dry side of the strips within the area under electrolytic fluid pressure and continuously engaging the strips as they move, whereby opposite sides of the strips are successively plated while in straight condition, electrical insulating backing material, said backing material being disposed across the space between said rolling cathodic means to prevent contact of said electrolyte with one side of said strips.

12. In an electroprocessing machine, a continuously moving cathodic strip looped to present successive straight areas with opposite sides alternating, a cell opposite and beneath each area adjacent the straight portion of the strip, the strip being spaced from the bottom and side walls of the cell, the spacing between the side walls and strip providing a restricted passageway for the flow of the electrolyte over said side walls, an anode in each cell, means of supplying electrolyte under pressure positioned to direct the flow of electrolyte over said anode and engage the bottom of the strip while under pressure and overflow over the top of the cell beneath the bottom and edges of the strip, and a rolling cathodic hold-down contact means contacting the upper dry side of the strip within the area under electrolytic fluid pressure and continuously engaging the strip as it moves, whereby opposite sides of the strip are successively plated while in straight condition, said rolling cathodic contact means including members comprising rolling members having central electrical current conducting sections and having adjacent electrical insulating portions.

13. In an electroprocessing machine, a continuously moving cathodic strip presenting a straight area, a cell opposite and beneath said area adjacent the straight portion of the strip, the strip being spaced from the bottom and side walls of the cell, the spacing between the side walls and strip providing a restricted passageway for the flow of the electrolyte over said side walls, an anode in each cell, means of supplying electrolyte comprising a salt of the metal of said continuously moving strip, under pressure positioned to direct the flow of electrolyte over said anode and engage the bottom of the strip while under pressure and overflow over the top of the cell beneath the bottom and edges of the strip, and a cathodic hold-down contact means contacting the upper dry side of the strip within the area under electrolytic fluid pressure and continuously engaging the strip as it moves, whereby opposite sides of the strip are successively plated while in straight condition, said strip being subjected to high current densities on the order of 200 to 1000 amperes per square foot.

14. In an electroprocessing machine, a continuously moving cathodic strip looped to present successive straight areas with opposite sides alternating, a cell opposite and beneath each area adjacent the straight portion of the strip, the strip being spaced from the bottom and side walls of the cell, the spacing between the side walls and strip providing a restricted passageway for the flow of the electrolyte over said side walls, an anode in each cell, at least one of said anodes comprising a plurality of sections positioned adjacent spaced smaller sections, said last-named sections comprising electrical insulating material of larger diameter than said first-mentioned sections and arranged on a common axis with said anodes and adapted to rotate said anodes by contact with said strip, means of supplying electrolyte under pressure positioned to direct the flow of electrolyte over said anode and engage the bottom of the strip while under pressure and overflow over the top of the cell beneath the bottom and edges of the strip, and a cathodic hold-down contact means contacting the upper dry side of the strip within the area under electrolytic fluid pressure and continuously engaging the strip as it moves, whereby opposite sides of the strip are successively plated while in straight condition.

WESLEY F. HALL.